United States Patent [19]

Bischoff et al.

[11] 4,207,292
[45] Jun. 10, 1980

[54] SYSTEM FOR REDUCING SULFUR DIOXIDE

[75] Inventors: William F. Bischoff, Califon; Peter Steiner, Edison, both of N.J.

[73] Assignee: Foster Wheeler Energy Corporation, Livingston, N.J.

[21] Appl. No.: 936,464

[22] Filed: Aug. 24, 1978

[51] Int. Cl.² ..................... C01B 17/04; B01J 8/12
[52] U.S. Cl. ........................ 422/232; 422/176; 422/216; 422/220; 423/244; 423/569; 423/570
[58] Field of Search .............. 422/176, 168, 219, 220, 422/216, 232, 233; 423/244 R, 569, 570

[56] References Cited

U.S. PATENT DOCUMENTS

| | | | |
|---|---|---|---|
| 1,686,077 | 10/1928 | Evans | 222/1 |
| 1,702,311 | 2/1929 | Patenburg | 55/58 |
| 1,836,301 | 12/1931 | Bechthold | 55/61 |
| 2,384,932 | 9/1945 | Lechthaler | 422/219 X |
| 2,393,893 | 1/1946 | Evans et al. | 208/171 |
| 2,400,194 | 5/1946 | Day et al. | 422/216 X |
| 2,554,435 | 5/1951 | Weber | 422/216 |
| 2,577,791 | 12/1951 | McKinney | 422/219 X |
| 2,766,189 | 10/1956 | Shimp | 422/216 X |
| 2,780,310 | 2/1957 | Schaub | 422/216 X |
| 2,881,134 | 4/1959 | Findlay | 208/165 |
| 2,882,912 | 4/1959 | Reeg et al. | 422/219 X |
| 2,897,138 | 7/1959 | Ardern | 208/165 |
| 2,937,138 | 5/1960 | Beuther | 422/216 X |
| 2,949,347 | 8/1960 | Van Pool | 422/220 X |
| 3,159,209 | 12/1964 | Dailey | 422/216 X |
| 3,274,701 | 9/1966 | Niemitz | 34/164 |
| 3,652,231 | 3/1972 | Greenwood et al. | 422/216 X |
| 4,095,953 | 6/1978 | Gutterman et al. | 422/219 X |

FOREIGN PATENT DOCUMENTS

| | | | |
|---|---|---|---|
| 684127 | 12/1952 | United Kingdom | 422/219 |
| 714831 | 9/1954 | United Kingdom | 422/216 |

Primary Examiner—Barry S. Richman
Attorney, Agent, or Firm—Marvin A. Naigur; John E. Wilson; John J. Herguth, Jr.

[57] ABSTRACT

A system for reducing sulfur dioxide in which a vessel is provided with an inlet for receiving coal and a plurality of gas distribution nozzles for receiving the sulfur dioxide and discharging same downwardly in the lower portion of the vessel for flowing upwardly in a counterflow relation to the coal. The coal flows through a distribution device located in the hopper section of the vessel for insuring an even distribution of coal through the vessel.

14 Claims, 3 Drawing Figures

4,207,292

SYSTEM FOR REDUCING SULFUR DIOXIDE

BACKGROUND OF THE INVENTION

This invention relates to a system for producing sulfur, and more particularly, to a system for reducing sulfur dioxide by contacting same with coal at elevated temperatures, to produce gaseous elemental sulfur.

Hydrocarbon fuels which are normally burned in industrial installations, such as coal and oil-fired power stations, contain sulfur which, under normal circumstances, is converted to sulfur dioxide in the combustion process. Although in older installations the sulfur dioxide was vented to the atmosphere with the other effluent gases from the process, recent air pollution control requirements have placed great emphasis on removing the sulfur dioxide from the gases before the latter are expelled into the atmosphere. One successful technique in this respect is to remove the sulfur dioxide from polluted gas streams by adsorption on carbon to form sulfuric acid, followed by a regeneration of the adsorbent to produce a stream of high sulfur dioxide concentration.

In order to form a non-polluting by-product that can be accumulated in a useful form, various systems have also been proposed for converting the sulfur dioxide obtained in the foregoing manner to elemental sulfur. However, many of these latter systems require the use of natural gas or some other relatively expensive reducing agent. In this context, U.S. patent application Ser. No. 635,497, filed Nov. 26, 1975 and now U.S. Pat. No. 4,147,762 issued Apr. 3, 1979, by Peter Steiner and assigned to the assignee of the present invention discloses a process in which a gas containing sulfur dioxide is contacted with granular coal to produce sulfur. This has the advantage of utilizing crushed coal, which is the least expensive reducing agent, and is thus very attractive from a cost standpoint.

However, according to this process a less than optimum distribution of the downwardly flowing coal through the vessel as well as the upward flowing sulfur dioxide gas through the coal is achieved. This distribution is particularly important since it is necessary in these type arrangements to achieve the highest efficiency possible.

SUMMARY OF THE INVENTION

It is therefore an object of the present invention to provide a system for reducing sulfur dioxide to elemental sulfur in which coal is used as a reducing agent and is passed through a single reactor vessel having a coal distribution system which achieves a relatively efficient sulfur dioxide reduction.

It is a further object of the present invention to provide a system of the above type in which the sulfur dioxide gas entering the vessel is distributed uniformly with respect to the coal in the vessel to increase the efficiency of the process.

Toward the fulfillment of this and other objects the system of the present invention includes a vessel having an inlet located in the upper portion thereof for receiving coal. A plurality of nozzles are provided for discharging sulfur dioxide into the lower portion of the vessel so that it rises upwardly in the vessel in a counterflow relation to the coal to oxidize the coal and convert it to ash and to convert the sulfur dioxide to elemental sulfur. A flow distribution member is disposed in the vessel and has upper and lower truncated conical portions and a plurality of passages through which the coal flows. Each is disposed at a predetermined angle relative to the longitudinal axis of the element to promote a uniform and continuous flow of coal through the vessel.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein.

DESCRIPTION OF THE PREFERRED EMBODIMENT

Figure 1:
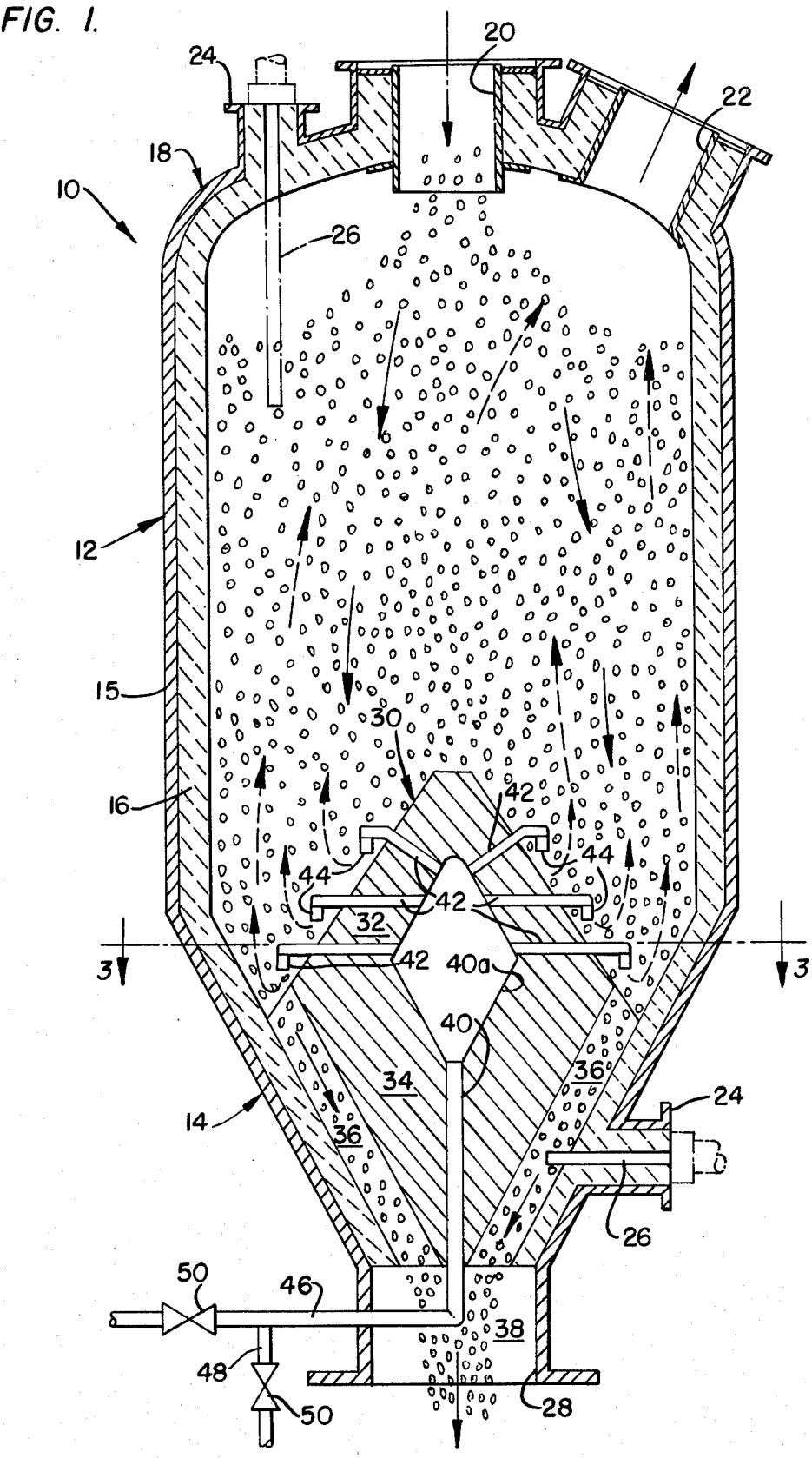
FIG. 1 is a vertical cross sectional view of the system of the present invention taken along the line 1—1 of FIG. 2.
Figure 2:
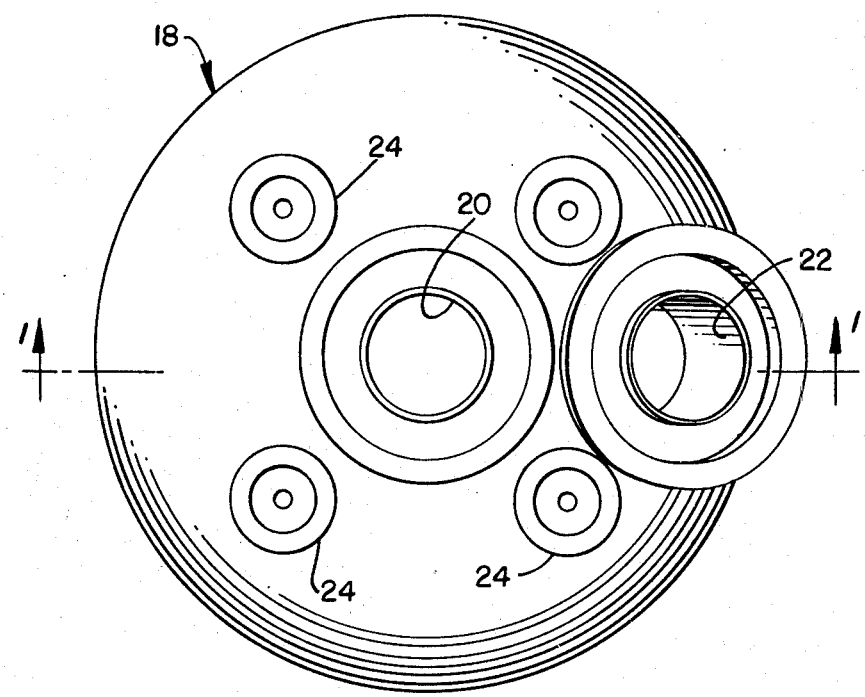
FIG. 2 is a top plan view of the vessel utilized in the system of the present invention.
Figure 3:
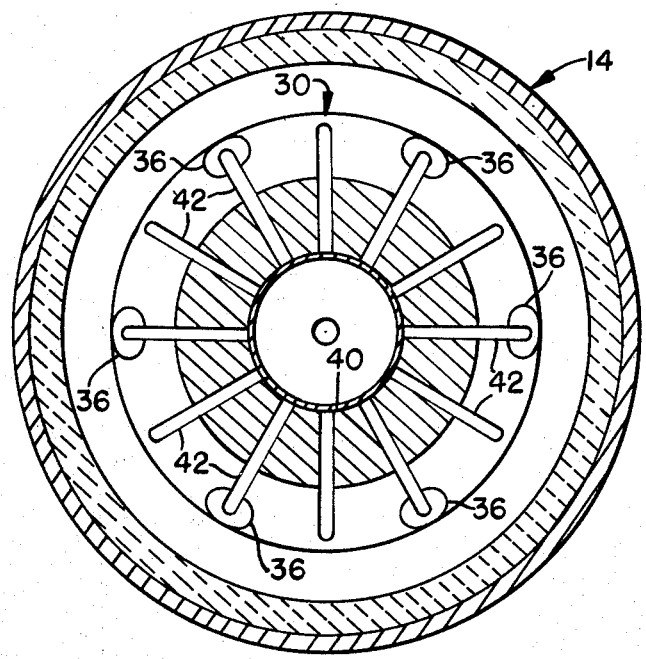
FIG. 3 is a cross sectional view taken along the line 3—3 of FIG. 1.

Referring specifically to FIGS. 1-3, the reference numeral 10 refers in general to a reactor vessel which has an upper cylindrical portion 12 and a lower conical portion 14. The outer portion of the wall of the vessel 10 can be formed of a shell 15 of carbon steel, while the inner portion of the wall is provided with a thermal-insulating layer 16 of refractory material, in a conventional manner.

The lower vessel portion 14 is formed integrally with the upper portion and forms a hopper section for the discharge of coal, as will be described later. The upper vessel portion 12 is provided with a cover 18 formed integral therewith and having a coal inlet 20 and a gas outlet 22 formed therethrough. The coal inlet 20 is disposed centrally, or coaxially, with respect to the longitudinal axis of the vessel 10 and is adapted to receive granular coal from an external source, and the outlet 22 is angularly offset relative to the inlet 20 and is adapted to discharge the gaseous elemental sulfur formed in the vessel 10, as will be explained in detail later.

As shown in FIG. 2, four thermowells 24 extend through the cover 18 and are disposed in an angularly spaced relationship around the longitudinal axis of the vessel 10. Each thermowell contains a multiplicity of thermocouples 26, with the latter extending at various heights within the vessel 10 to monitor the temperature therein. A radially extending thermowell 24 is provided through the wall of the lower vessel portion 14 and also contains a plurality of thermocouples 26 for performing the same function. It is understood that additional radially extending thermowells 24 can be provided in a longitudinal spaced relationship along the wall of the vessel 10 as needed.

An outlet 28 is provided in the lower vessel portion 14 for discharging granular ash and any unburned coal that passes through the vessel 10.

A flow distribution member 30 is disposed in the lower vessel portion 14 and operates to regulate the uniformity of the flow of the coal through the vessel 10. The configuration of the member 30 resembles two, separate, truncated conical sections 32 and 34, which are joined together at their base surfaces, with the outer surface of the lower, conical section 34 shaped to conform to the inner, conical surface of the lower vessel portion 14 and the upper, conical section 32 extending upwardly within the interior volume of the vessel 10. A plurality of passages 36 extend longitudinally through the flow distribution member 30, with the lower opening of each passage in fluid communication with a flow chamber 38 formed in the lower portion of the vessel portion 14 immediately above the outlet 28, and in fluid communication therewith. As shown in FIG. 3, six passages 36 are provided with their upper, inlet openings being spaced at sixty degree intervals around the upper surface of the member 30.

The central, longitudinal axis of each passage 36 is disposed at an angle relative to the longitudinal axis of the vessel 10. According to a preferred embodiment the angular orientation of the passages 36 may be within the range of 5°-35° to prevent clogging of the holes or straight through flow, with the preferred angle being approximately 20°. The angular references used herein, of course, refer to the acute angle that the longitudinal axis of each passage 36 makes with the longitudinal axis of the vessel 10.

The number, size and angular orientation of the passages 36 in the flow distribution member 30 are related to the internal diameter of the vessel 10. In the illustrative embodiment of the flow distribution member 30 shown in FIGS. 1 and 3, the internal diameter of the upper vessel portion 12 is approximately 8 feet, and each of the six passages 36 is approximately 8 inches in diameter. Also, as set forth above, the angle that the longitudinal axis of each passage 36 makes with the longitudinal axis of the vessel 10 is approximately 20°. Accordingly, if the diameter of the upper vessel portion 12 is increased, then additional passages 36 would be provided in the flow distribution member 30, or the size of each passage 36 increased, or both. Also, the angular orientation of each of the passages 36 would be decreased proportionately within the 5°-20° range. Conversely, the same considerations apply if the diameter of the upper vessel portion 12 section is reduced. Thus, by directly proportioning the number, size and angular orientation of the passages 36 relative to the size of the vessel 10, the desirable and necessary even flow distribution of the coal through the vessel can be achieved.

Referring to FIG. 1 the flow distribution member 30 is provided with a longitudinal bore which receives an inlet pipe 40 of a sulfur dioxide gas discharge system. The latter also includes a plurality of radially extending pipes 42 disposed in radially extending bores formed in the member 30. The pipe 40 has an enlarged upper end portion 40a to which the pipes 42 are connected, with each of the other ends of the latter pipes projecting outwardly from its respective bore and being connected to a downwardly directed nozzle 44 (FIG. 1). As noted from FIGS. 1 and 3 there are three tiers of pipes 42 with each tier consisting of twelve pipes disposed at thirty degree intervals. The lengths of the pipes in the respective tiers vary, with the longest length pipes 42 being in the lower tier and the shortest length pipes in the upper tier. As shown in FIG. 1, the pipes 42 in the upper tier extend at a slight angle to the horizontal and the pipes in the lower tier extend immediately above the upper ends, or inlets, of the passages 36.

The inlet pipe 40 is connected to a source of gas, which in this case, is sulfur dioxide, by a supply pipe 46 and a pipe 48 is also connected to the pipe 46 for supplying steam for the reasons disclosed in the above-cited patent application. The pipes 46 and 48 are fitted with valves 50 for controlling the flow through the pipes in a conventional manner.

The flow distribution member 30 is preferably made from an abrasion-resistant refractory material to withstand the abrasion of the coal at the elevated temperatures customarily encountered within the vessel 10. Alternatively, the member 30 may be made of a metallic core covered with a layer of an abrasion-resistant material. The member 30 may be fabricated as a single, monolithic structure, with the passages 36 and the bores for receiving the pipes 40 and 42 being integrally formed during the fabrication process. Alternatively, the member 30 may be fabricated from a plurality of equal sections, which are subsequently joined to form the member. Similarly, the member 30 may be fabricated in two, separate, longitudinal sections to reduce the expense involved in the fabrication thereof.

In operation, coal is continuously passed into the coal inlet 20 from an external source, such as a conveyor or the like, whereby the coal passes continuously downwardly through the length of the vessel 10 as shown by the solid arrows in FIG. 1. A startup heater, or the like (not shown) can be provided externally of the vessel 10 to build up the temperature of the coal to a predetermined level sufficient to permit the desired reaction to occur as will be described later.

The flow of the coal through the passages 36 in the flow distribution member 30 provides for an even distribution of the coal through the vessel 10 with the coal flowing at a uniform velocity with a minimum of residence time. The coal passes downwardly through each of the passages 36 and into the flow chamber 38 with the flow rate of the coal from the chamber 38 being controlled, in turn, by a feeder, or the like, (not shown) disposed adjacent the outlet 28.

The sulfur dioxide-rich gas passes from an external source through the pipes 46, 40, and 42 and is discharged through each nozzle 44 downwardly in the lower vessel portion 14 where it fans upwardly and flows by natural convection upwardly in a counterflow relation to the burning coal as shown by the dashed arrows in FIG. 1. This provides an even distribution of the gases throughout the coal and thus increases the efficiency of operation. Upon contact of the sulfur dioxide rich gas with the burning coal, the sulfur dioxide is reduced to gaseous elemental sulfur and the liberated oxygen combines with a portion of the coal to form carbon dioxide. The gases thus formed pass outwardly from the outlet 22 and can be introduced to an external unit such as a condenser or the like, for further treatment. The ash exiting from the outlet 28 can be recycled to recover any unburned coal present therein and/or can be disposed of in a conventional manner. Specific details of the chemical reaction that occurs are disclosed in the above-cited patent application.

It is understood that several variations can be made in the foregoing without departing from the scope of the invention. For example, the invention is not limited to the specific number of inlets, outlets, and nozzles shown but rather this number can vary in accordance with particular design requirements.

It can be appreciated that as a result of the even distribution of the coal through the vessel and the sulfur dioxide gas through the coal, an improved operating efficiency is achieved at no particular increase in cost.

In the context of the present discussion, the terms "flow control" and "flow distribution" have specific meanings. "Flow control" refers to the rate of quantity flow through the regeneration vessel, which in turn is determined by the rate of quantity input of the coal into the vessel, and the rate of quantity removal from the vessel via the feeder disposed at the outlet of the vessel. "Flow distribution" relates to the flow characteristic, i.e., the uniformity, of the flow of the coal in the vessel. The flow distribution device 30 of the present invention evens out the flow velocities of the coal and minimizes the difference in residence time between the coal particles. Since the reduction process is principally a chemical process, the uniformity of flow of the coal ensures a maximum reduction of a great portion of the coal particles.

Of course, variations of the specific construction and arrangement of the system disclosed above, can be made by those skilled in the art without departing from the invention as defined in the appended claims.

What is claimed is:

1. A system for reducing sulfur dioxide comprising a vessel, inlet means located in the upper portion of said vessel for receiving coal, means for discharging sulfur dioxide into the lower portion of said vessel in a downward direction so that it rises upwardly in the vessel in a counterflow relation to the coal to oxidize the coal and convert it to ash and to convert the sulfur dioxide to elemental sulfur, said discharging means comprising a plurality of nozzles disposed in said vessel and adapted to discharge said sulfur dioxide downwardly into the lower portion of said vessel, and a flow distribution member disposed in said vessel and having a plurality of through passages formed therethrough, each of said passages being disposed at a predetermined angle relative to the longitudinal axis of said vessel, said coal flowing through said passages to promote a uniform and continuous flow of coal through said vessel, said discharging means further comprising a piping system connected to a source of said sulfur dioxide, extending through bores formed in said flow distribution member and connected to said nozzles.

2. The system of claim 1, further comprising outlet means located in the lower portion of said vessel below said flow distribution member for discharging said ash.

3. The system of claim 1, wherein said passages are angularly spaced about said longitudinal axis.

4. The system of claim 1, wherein the angle of each of said passages is within the range of 5° to 35°.

5. The system of claim 1, wherein the angle of each of said passages is 20°.

6. The system of claim 1, wherein the inlets of said passages are located immediately below said discharge means.

7. The system of claim 1, wherein said nozzles are spaced radially and longitudinally in said vessel.

8. The system of claim 1, wherein said piping system includes a central inlet pipe connected to said source of sulfur dioxide and extending vertically through the central portion of said flow distribution member and a plurality of pipes connected to said inlet pipe and extending substantially radially through said flow distribution member, the distal ends of said latter pipes projecting out from said flow distribution member and being connected to said nozzles.

9. The system of claim 1, wherein the upper portion of said vessel is generally cylindrically shaped and wherein the lower portion of said vessel is generally conically shaped.

10. The system of claim 7, wherein said flow distribution member has upper and lower truncated portions, with the lower truncated portion engaging and being supported by said lower portion of said vessel.

11. The system of claim 1, wherein said nozzles are arranged in a plurality of tiers with a plurality of nozzles extending in each tier.

12. The system of claim 11, wherein the nozzles of each tier extend in an angularly spaced relationship.

13. The system of claim 11, wherein the nozzles of each tier are radially spaced from the longitudinal axis of said vessel a distance that varies from that of the nozzles in the other tiers.

14. A system for reducing sulfur dioxide comprising a vessel, inlet means located in the upper portion of said vessel for receiving coal, a plurality of nozzles disposed in a radially and longitudinally spaced relation in the lower portion of said vessel for discharging sulfur dioxide in a downward direction so that it rises upwardly in the vessel in a counterflow relation to the coal to oxidize the coal and convert it to ash and to convert the sulfur dioxide to elemental sulfur, and outlet means associated with said vessel for discharging said elemental sulfur, a piping system connected to a source of said sulfur dioxide, extending through bores formed in said flow distribution member and connected to said nozzles, wherein said piping system includes a central inlet pipe connected to said source of sulfur dioxide and extending vertically through the central portion of said flow distribution member and a plurality of pipes connected to said inlet pipe and extending substantially radially through said flow distribution member, the distal ends of said latter pipes projecting out from said flow distribution member and being connected to said nozzles.

* * * * *